United States Patent
Osman et al.

(10) Patent No.: US 7,323,516 B2
(45) Date of Patent: Jan. 29, 2008

(54) PEROXIDE CURABLE BUTYL FORMULATIONS FOR RUBBER ARTICLES

(75) Inventors: Akhtar Osman, Sarnia (CA); Adam Gronowski, Sarnia (CA)

(73) Assignee: Lanxess Inc., Sarnia, Ontario (CA)

( * ) Notice: Subject to any disclaimer, the term of this patent is extended or adjusted under 35 U.S.C. 154(b) by 0 days.

(21) Appl. No.: 11/005,174

(22) Filed: Dec. 6, 2004

(65) Prior Publication Data

US 2006/0122317 A1   Jun. 8, 2006

(30) Foreign Application Priority Data

Dec. 3, 2004 (CA) .................................. 2489036

(51) Int. Cl.
*C08L 27/02* (2006.01)

(52) U.S. Cl. ................. 525/191; 525/199; 525/232; 525/240; 525/241; 525/215; 525/214; 525/200; 525/233; 525/238

(58) Field of Classification Search ............... 525/191, 525/199, 232, 240, 241, 215, 214, 200, 238, 525/233
See application file for complete search history.

(56) References Cited

U.S. PATENT DOCUMENTS

| | | | |
|---|---|---|---|
| 3,584,080 A | 6/1971 | Walker et al. | 260/889 |
| 5,578,682 A | 11/1996 | White | 525/282 |
| 5,994,465 A | 11/1999 | Sudo et al. | 525/105 |
| 6,120,869 A * | 9/2000 | Cotsakis et al. | 428/42.3 |
| 6,255,389 B1 * | 7/2001 | Ouhadi et al. | 525/76 |
| 6,262,879 B1 | 7/2001 | Nitta et al. | 381/517 |
| 6,745,796 B2 | 6/2004 | Ikemoto et al. | 138/126 |
| 6,774,186 B2 | 8/2004 | Walton | 525/191 |
| 6,825,277 B2 * | 11/2004 | van Issum et al. | 525/191 |
| 6,946,522 B2 * | 9/2005 | Jacob et al. | 525/191 |
| 2006/0098384 A1 | 5/2006 | Takeda et al. | 361/272 |

FOREIGN PATENT DOCUMENTS

| | | |
|---|---|---|
| CA | 2458741 | 2/2004 |
| JP | 55-062943 | 5/1980 |
| JP | 06-107738 | 4/1994 |
| JP | 06-172547 | 6/1994 |
| JP | 08-077838 | 3/1996 |

* cited by examiner

*Primary Examiner*—Robert D. Harlan
(74) *Attorney, Agent, or Firm*—Jennifer R. Sang

(57) ABSTRACT

The present invention is directed to a peroxide curable rubber compound containing a butyl rubber polymer and an olefin polymer of ethylene and at least one α-olefin. The present invention is also directed to a peroxide curable rubber compound containing a butyl polymer and an EP(D)M rubber polymer.

9 Claims, 1 Drawing Sheet

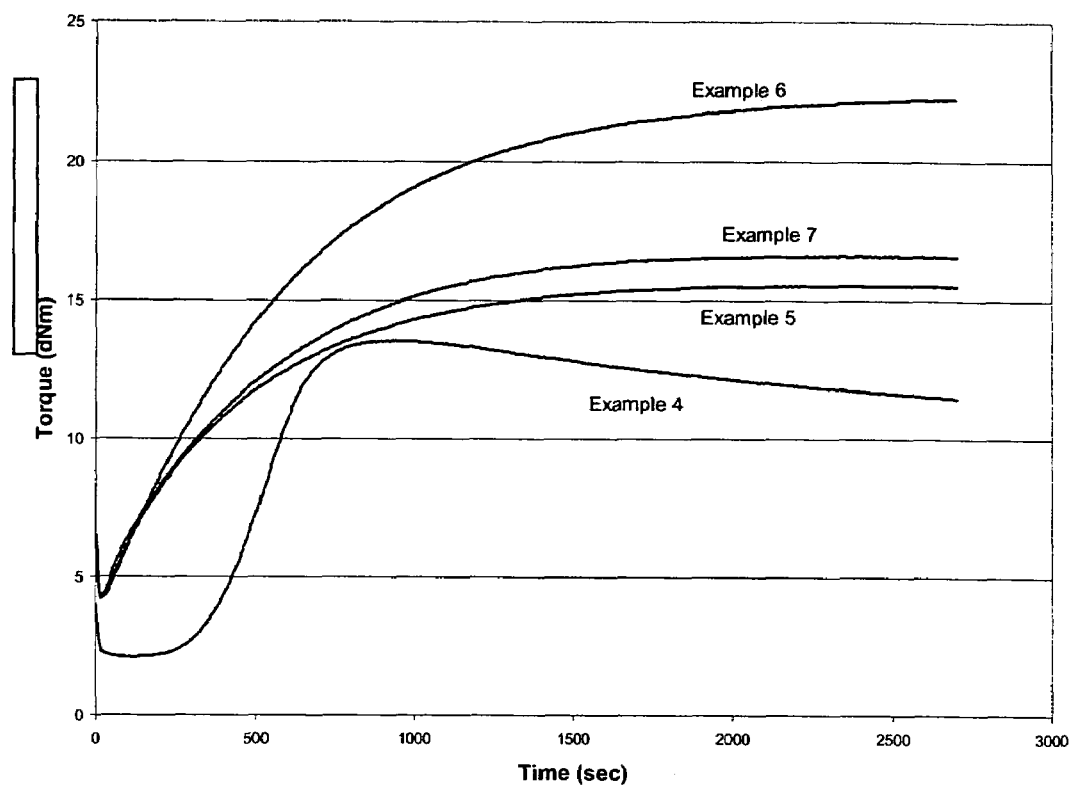

PEROXIDE CURABLE BUTYL FORMULATIONS FOR RUBBER ARTICLES

FIELD OF THE INVENTION

The present invention is directed to a peroxide curable rubber compound containing a butyl rubber polymer and an olefin polymer of ethylene and at least one α-olefin. The present invention is also directed to a peroxide curable rubber compound containing a butyl polymer and an EP(D)M rubber polymer.

BACKGROUND OF THE INVENTION

As is known in the art, peroxide curable rubber compounds offer several advantages over conventional, sulfur-curing, systems. Typically, these compounds display very fast cure rates and the resulting cured articles tend to possess excellent heat resistance and low compression set. In addition, peroxide-curable formulations are much "cleaner" in that they do not contain any extractable inorganic impurities (e.g. sulfur). Such rubber articles can therefore be used, for example, in condenser caps, biomedical devices, pharmaceutical devices (stoppers in medicine-containing vials, plungers in syringes) and possibly in seals for fuel cells.

The use of butyl-type rubber for sealing applications over other synthetic rubbers is preferred because of butyl rubbers non-permeability of gases such as oxygen, nitrogen, etc., and moisture and its stability to acids, alkalis and chemicals.

A commercially available butyl terpolymer based on isobutylene, isoprene and divinylbenzene (DVB), sold under the tradename Bayer XL-10000, is curable with peroxides alone. However, this material possesses some disadvantages. Since the DVB is incorporated during the polymerization process a significant amount of crosslinking occurs during manufacturing. The resulting high Mooney viscosity (ca. 60-75 MU, $M_L1+8@125°$ C.) and presence of gel particles make this material difficult to process. Also, the presence of significant amounts of free DVB can present safety concerns. It would be desirable to have an isobutylene based polymer which is peroxide curable, completely soluble (i.e. gel free) and devoid of harmful or malodorous chemicals in its composition.

It is well known that compounds containing butyl rubber and polyisobutylene decompose under the action of organic peroxides. Therefore, in these compounds the presence of cure promoters (co-agents) is needed.

One approach to obtaining a peroxide-curable butyl-based formulation lies in the use of conventional butyl rubber in conjunction with a vinyl aromatic compound like DVB and an organic peroxide (see JP-A-107738/1994). In place of DVB, an electron-withdrawing group-containing polyfunctional monomer (ethylene dimethacrylate, trimethylolpropane triacrylate, N,N'-m-phenylene dimaleimide) can also be used (see JP-A-172547/1994).

White et al. (U.S. Pat. No. 5,578,682) discloses a process for obtaining an uncured polymer with a bimodal molecular weight distribution derived from a polymer that originally possessed a monomodal molecular weight distribution. The polymer, e.g., polyisobutylene, a butyl rubber or a copolymer of isobutylene and para-methylstyrene, was mixed with a polyunsaturated crosslinking agent (and, optionally, a free radical initiator) and subjected to high shearing mixing conditions in the presence of organic peroxide. This bimodalization was a consequence of the coupling of some of the free-radical degraded polymer chains at the unsaturation present in the crosslinking co-agent. White, et al. is silent about the filled compounds of such modified polymers or the cure state of such compounds.

Sudo et. al. (U.S. Pat. No. 54,465) discloses a method for curing regular butyl, with isoprene contents ranging from 0.5 to 2.5 mol %, by treatment with a peroxide and a bismaleimide species. The rubber composition contains optionally an organosilicone compound and the articles thereof are useful for pharmaceutical chemicals or medical treatments. The compositions of Sudo, et al. have excellent molten fluidity after cure.

Co-Pending CA Patent Application 2,458,741 describes the preparation of butyl-based, peroxide curable compounds which employed the use of novel grades of high isoprene butyl rubber. According to this application, N,N'-m-phenylenedimaleimide is useful as a cure promoter (co-agent).

Cotsakis et al. (U.S. Pat. No. 6,120,869) discloses a pressure sensitive tape for forming water-tight field joints in rubber membranes. This adhesive roofing tape was based on a combination of brominated butyl rubber and EPDM rubber utilizing a peroxide cure system. Both these rubbers can be cured separately with peroxides alone. An important aspect of Costsakis, et al. is to have a high molecular weight polyisobutylene as a plasticizer. The degradation products from the action of peroxide on PIB contributed to surface tack.

For some specific applications, like elastic closures for electrolytic condensers (capacitors) the presence of halogens in the compound is not desirable. This is because the halogens present in the elastic rubber cap (in contact with an electrolyte) can interact with a copper wire of the condenser causing corrosion and subsequently electrolyte leakage. Therefore the above-mentioned applications would not be suitable for condenser caps.

Walker et al. (U.S. Pat. No. 3,584,080) claimed peroxide-vulcanizable compositions comprising copolymers of an isoolefin (e.g., isobutylene) and an aromatic divinyl compound (like divinylbenzene) together with a minor amount of a rubbery or resinous polymer (such as PE, NR or EP(D)M rubber) present in a mixed compound. The central aspect of this invention was that each kind of rubber introduced into a compound was peroxide-curable on its own. Both isobutylene-divinylbenzene copolymers and isobutylene-isoprene-divinylbenzene terpolymers are peroxide curable. The present invention differs from that of Walker et al. in that no divinylbenzene is present in the isobutylene-containing polymer (i.e., butyl rubber). Surprisingly, the properties of the inventive compounds of the present disclosure gave good final properties after curing, despite the fact that butyl rubber on its own degrades under the action of free radicals. It is much easier to manufacture a regular butyl rubber than butyl rubber crosslinked with divinylbenzene.

Saotome (JP 55-62943 A1) discloses a thermoplastic elastic polymer composition produced by heating and mixing a mixture of butyl-based rubber (IIR or PIB) and an EP(D)M rubber in the presence of an organic peroxide, and partially curing the mixture. The resulting polymer composition has excellent molten fluidity and is intended for hot-melt adhesives and sealants when a tackifier is added to it. The amount of peroxide present in the compound is typically in a range of 0.1 to 1.5 parts per 100 parts of polymer. The examples are based on blends composed of 70 parts of EP(D)M rubber and 30 parts of butyl rubber or PIB. Saotome is specific for compositions having excellent molten processability (and hence the degree of crosslinking has to be limited) and it is silent of the cure state characteristics (e.g., from the MDR test) of the compounds. In fact, the central aspect of Saotome is to suppress the generation of gel which hinders the processability in melt.

EPDM rubber is known to be used in several applications where butyl rubber is utilized, e.g., cable insulation, shock absorber parts, window seals, roofing membranes and condenser caps. However, EPDM cannot match butyl rubber in impermeability for gases and moisture. For a specific application like a condenser cap, a peroxide cured compound based on butyl and EPDM should be superior to that containing EPDM alone.

The present invention describes the preparation of butyl-containing, peroxide-curable compounds which employ the use of regular butyl rubber and EP(D)M rubber. The butyl rubber gives predominantly a sealing property and surprisingly the EP(D)M rubber acts as a cure promoter (co-agent) for IIR. Since the co-agent is polymeric in nature it minimizes the co-agent leaching, a common problem when utilizing low molecular weight additives.

The MDR and stress-strain characteristics of the vulcanized compounds prepared according to the present invention are comparable or better than those of a comparative compound based on a peroxide-curable butyl rubber Bayer XL-10000. This demonstrates a significant degree of crosslinking in the final products which are not intended for good processability in the molten state, as in JP 55-62943 A1. The rubber articles based on compounds according to the present invention are useful for sealing applications where a high Shore A hardness, good elongation and low permeability to gases or moisture is important such as for electrolytic condenser caps.

SUMMARY OF THE INVENTION

The present invention relates to a peroxide curable butyl compound containing a butyl rubber polymer and a polymer of ethylene and at least one α-olefin. The present invention also relates to a peroxide curable compound containing a butyl rubber polymer and an EP(D)M rubber polymer.

The present invention also relates to a process for preparing a peroxide curable compound including mixing a butyl rubber polymer, an EP(D)M rubber polymer and at least one peroxide curing agent.

The present invention further relates to article containing peroxide curable compounds prepared with a butyl rubber polymer and an EP(D)M rubber polymer.

BRIEF DESCRIPTION OF THE DRAWINGS

The Figure illustrates the MDR cure curves of compounds prepared according to the present invention and comparative compounds.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about." Also, all ranges include any combination of the maximum and minimum points disclosed and include any intermediate ranges therein, which may or may not be specifically enumerated herein.

The present invention relates to butyl polymers. The terms "butyl rubber", "butyl polymer" and "butyl rubber polymer" are used throughout this specification interchangeably. Suitable butyl polymers according to the present invention are derived from a monomer mixture containing a $C_4$ to $C_7$ monoolefin monomer and a $C_4$ to $C_{14}$ multiolefin monomer. Suitable butyl polymers according to the present invention are also essentially gel free (<10 wt. % gel).

In connection with the present invention the term "gel" is understood to denote a fraction of the polymer insoluble for 60 minutes in cyclohexane boiling under reflux. According to the present invention the gel content is preferably less than 10 wt. %, more preferably less than 5 wt %, most preferably less that 3 wt % and even most preferably less than 1 wt %.

Preferably, the monomer mixture contains from about 80% to about 99% by weight of a $C_4$ to $C_7$ monoolefin monomer and from about 1.0% to about 20% by weight of a $C_4$ to $C_{14}$ multiolefin monomer. More preferably, the monomer mixture contains from about 85% to about 99% by weight of a $C_4$ to $C_7$ monoolefin monomer and from about 1.0% to about 10% by weight of a $C_4$ to $C_{14}$ multiolefin monomer. Most preferably, the monomer mixture contains from about 95% to about 99% by weight of a $C_4$ to $C_7$ monoolefin monomer and from about 1.0% to about 5.0% by weight of a $C_4$ to $C_{14}$ multiolefin monomer.

The preferred $C_4$ to $C_7$ monoolefin monomer may be selected from isobutylene, 2-methyl-1-butene, 3-methyl-1-butene, 2-methyl-2-butene, 4-methyl-1-pentene and mixtures thereof. The most preferred $C_4$ to $C_7$ monoolefin monomer is isobutylene.

The preferred $C_4$ to $C_{14}$ multiolefin monomer may be selected from isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof. The most preferred C4 to C14 multiolefin monomer is isoprene.

The monomer mixture used to prepare suitable butyl rubber polymers for the present invention may contain crosslinking agents, transfer agents and further monomers, provided that the other monomers are copolymerizable with the other monomers in the monomer mixture. Suitable crosslinking agents, transfer agents and monomers include all known to those skilled in the art.

Butyl rubber polymers useful in the present invention can be prepared by any process known in the art and accordingly the process is not restricted to a special process of polymerizing the monomer mixture. Such processes are well known to those skilled in the art and usually include contacting the monomer mixture described above with a catalyst system. The polymerization can be conducted at a temperature conventional in the production of butyl polymers—e.g., in the range of from −100° C. to +50° C. The polymer may be produced by polymerization in solution or by a slurry polymerization method. Polymerization can be conducted in suspension (the slurry method), see, for example, Ullmann's Encyclopedia of Industrial Chemistry (Fifth, Completely Revised Edition, Volume A23; Editors Elvers et al., 290-292). On an industrial scale, butyl rubber is produced almost exclusively as isobutene/isoprene copolymer by cationic solution polymerization at low-temperatures; cf. for example Kirk-Othmer, Encyclopedia of Chemical Technology, 2nd ed., Vol. 7, page 688, Interscience Publ., New York/London/Sydney, 1965 and Winnacker-Kuchler, Chemische Technologie, 4th Edition, Vol. 6, pages 550-555, Carl Hanser Verlag, Munchen/Wien, 1962. The expression "butyl rubber" can also denote a halogenated butyl rubber.

The present invention relates to peroxide curable compounds containing a butyl polymer and an olefin polymer of ethylene and at least one α-olefin. Suitable olefin polymers contian monomers of ethylene and at least one α-olefin such as prolylene. The olefin polymer can also contain other alpha-olefin monomers, such as 1-butene, hexene-1, octene-1,4-methylpentene-1, decene-1, dodecene-1, tridecene-1, tetradecene-1, pentadecene-1, hexadecene-1, heptadecene-1, octadecene-1, nonadecene-1 and mixtures thereof and/or diene monomers to form terpolymers or tetrapolymers.

Preferably the olefin polymer according to the present invention is a polymer of ethylene, propylene and at least one additional conjugated diene monomer, for example isoprene and 1,3-butadiene, or an unconjugated diene containing 5 to 25 carbon atoms, for example 1,4-pentadiene, 1,4-hexadiene, 1,5-hexadiene, 2,5-dimethyl-1,5hexadiene and 1,4-octadiene; cyclic dienes, for example cyclopentadiene, cyclohexadiene, cyclooctadiene and dicyclopentadiene; alkylidene and alkenyl norbornenes, for example 5-ethylidene-2-norbornene, 5-butylidene-2-norbornene, 2-methallyl-5-norbornene, 2-isopropenyl-5-norbornene and tricyclodienes. The unconjugated dienes 1,5-hexadiene, ethylidene norbornene and dicyclopentadiene are preferred.

The term "EPDM" or "EPDM rubber polymer" or "EPDM rubber" are used interchangeably through this specification and denotes ethylene/propylene/diene terpolymers. EPDMs include rubbers in which the ratio by weight of ethylene to propylene units is in the range from 40:60 to 65:35 and which may contain from 1 to 20 C=C double bonds/1,000 carbon atoms. Suitable diene monomers in the EPDM include the preferred monomers listed above 5-hexadiene, ethylidene norbornene and dicyclopentadiene. The diene content in the EPDM is preferably 0.5 to 10% by weight, based on EPDM.

The compounds of the present invention contain from 50 to 98 parts of butyl polymer per hundred parts rubber, preferably 70 to 95 parts phr and from 2 to 50 parts of olefin polymer phr, preferably 5 to 30 parts phr.

The compound of the present invention further contains at least one peroxide curing system. The present invention is not limited to a special peroxide curing system. For example, inorganic or organic peroxides are suitable. For example, organic peroxides such as dialkylperoxides, ketalperoxides, aralkylperoxides, peroxide ethers, peroxide esters, such as di-tert.-butylperoxide, bis-(tert.-butylperoxy-isopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butylcumylperoxide and tert.-butylperbenzoate. Usually the amount of peroxide in the compound is in the range of from 2 to 10 phr (=per hundred rubber), or, for example, from 4 to 8 phr, preferably from 2 to 5 phr. Subsequent curing is usually performed at a temperature in the range of from 100 to 200° C., for example 130 to 180° C. Peroxides might be applied advantageously in a polymer-bound form. Suitable systems are commercially available, such as Polydispersion T(VC) D-40 P from Rhein Chemie Rheinau GmbH, D (polymerbound di-tert.-butylperoxy-isopropylbenzene).

The compound of the present invention may further contain other natural or synthetic rubbers such as BR (polybutadiene), ABR (butadiene/acrylic acid-$C_1$-$C_4$-alkylester-copolymers), CR (polychloroprene), IR (polyisoprene), SBR (styrene/butadiene-copolymers) with styrene contents in the range of 1 to 60 wt %, NBR (butadiene/acrylonitrile-copolymers with acrylonitrile contents of 5 to 60 wt %, HNBR (partially or totally hydrogenated NBR-rubber), EPDM (ethylene/propylene/diene-terpolymers), FKM (fluoropolymers or fluororubbers), and mixtures of the given polymers.

The compound may further contain at least one active or inactive filler. Suitable fillers include:

highly dispersed silicas, prepared e.g., by the precipitation of silicate solutions or the flame hydrolysis of silicon halides, with specific surface areas of in the range of from 5 to 1000 m$^2$/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m$^2$/g and primary particle diameters in the range of from 10 to 400 nm;

natural silicates, such as kaolin and other naturally occurring silica;

glass fibers and glass fiber products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide;

carbon blacks; the carbon blacks to be used here are prepared by the lamp black, furnace black or gas black process and have preferably BET (DIN 66 131) specific surface areas in the range of from 20 to 200 m$^2$/g, e.g. SAF, ISAF, HAF, FEF or GPF carbon blacks;

rubber gels, especially those based on polybutadiene, butadiene/styrene copolymers, butadiene/acrylonitrile copolymers and polychloroprene; or mixtures thereof.

Examples of suitable mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the tetrapolymer. For many purposes, the preferred mineral is silica, or for example, silica made by carbon dioxide precipitation of sodium silicate. Dried amorphous silica particles suitable for use in accordance with the present invention may have a mean agglomerate particle size in the range of from 1 to 100 microns, or, for example, between 10 and 50 microns or, between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trade names HiSil® 210, HiSil® 233 and HiSil® 243 from PPG Industries Inc. Also suitable are Vulkasil S and Vulkasil N, from Bayer AG.

It might be advantageous to use a combination of carbon black and mineral filler in the present inventive compound. In this combination the ratio of mineral fillers to carbon black is usually in the range of from 0.05 to 20, or, for example, 0.1 to 10. For the rubber composition of the present invention it is usually advantageous to contain carbon black in an amount of in the range of from 20 to 200 parts by weight, for example 30 to 150 parts by weight, or, for example, 40 to 100 parts by weight.

The rubber compound according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. For example, the compound furthermore may contain in the range of 0.1 to 20 phr of an organic fatty acid, such as a unsaturated fatty acid having one, two or more carbon double bonds in the molecule which more preferably includes 10% by weight or more of a conjugated diene acid having at least one conjugated carbon-carbon double bond in its molecule. For example, those fatty acids have in the range of from 8-22 carbon atoms, or for example, 12-18. Examples include stearic acid, palmitic acid and oleic acid and their calcium-, zinc-, magnesium-, potassium- and ammonium salts.

The ingredients of the final compound can be mixed together in any known manner, suitably at an elevated temperature that may range from 25° C. to 200° C. Normally the mixing time does not exceed one hour and a time in the range from 2 to 30 minutes is usually adequate. The mixing is suitably carried out in a suitable mixing means such as an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also, Encyclopedia of Polymer Science and Engineering, Vol. 4, p. 66 et seq. (Compounding) and Vol. 17, p. 666 et seq. (Vulcanization).

Furthermore, the present invention provides shaped articles containing the inventive peroxide-curable compound, which would then be vulcanized by heating it over the decomposition temperature of the peroxide and/or radiation. Articles prepared with compounds according to the present invention have the preferred properties of EPDM like very good resistance to ozone, weathering, heat, oxidation and good chemical resistance and have the impermeability to gasses and moisture of butyl rubber therefore making compounds according to the present invention suitable for applications such as containers for pharmaceuticals, in particular stopper and seals for glass or plastic vials, tubes, parts of syringes and bags for medical and non-medical applications, condenser caps and seals for fuel cells, parts of electronic equipment, in particular insulating parts, seals and parts of containers containing electrolytes, rings, dampening devices, ordinary seals, and sealants.

EXAMPLES

The compounds presented in the examples employed the use of Bayer Butyl Rubber (RB 402), Buna EP T 3950 (Polysar EPDM 585), Buna EP T 2070 (Polysar EP 306), carbon black (IRB #7) and a peroxide (DI-CUP 40C, Struktol Canada Ltd.). Mixing was accomplished with the use of a miniature internal mixer (Brabender MIM) from C. W. Brabender, consisting of a drive unit (Plasticorder® Type PL-V151) and a data is interface module.

Cure characteristics were determined with a Moving Die Rheometer (MDR) test carried out according to ASTM standard D-5289 on a Monsanto MDR 200 (E). The upper disc oscillated though a small arc of 1 degree.

Curing was achieved with the use of an Electric Press equipped with an Allan-Bradley Programmable Controller.

Stress-strain tests were carried out using an Instron Testmaster Automation System, Model 4464 according to ASTM standard D412, Method A.

All of the compounds studied were composed of:

| | |
|---|---|
| Polymer(s): | 100 phr |
| Carbon black (IRB #7; N330): | 50 phr |
| Peroxide (DI-CUP 40 C): | 2-5 phr |

Mixing was achieved with the use of a Brabender internal mixer (capacity ca. 75 g) with a starting temperature of 23° C. and a mixing speed of 50 rpm according to the following sequence:

| | |
|---|---|
| 0.0 min: | polymer(s) added |
| 1.5 min: | carbon black added, in increments |
| 7.0 min: | peroxide added |
| 8.0 min: | mix removed |

The final compound was refined on a 6"×12" mill.

Example 1

Comparative

The compound of Example 1 was based on a commercial butyl rubber (Bayer Butyl RB 402, isobutylene content=97.8 mol %, isoprene content=2.2 mol %). The amount of peroxide used was 3 phr.

As expected, no evidence of cure could be seen during the MDR test.

Example 2

Comparative

The compound of Example 2 was based on a commercial EPDM rubber (Buna EP T 3950). The amount of peroxide used was 2 phr.

The cured compound gave the following test results: delta torque=27.8 dN·m, Shore A hardness=60 points, ultimate tensile=25.04 MPa, and ultimate elongation=453%.

Example 3

Comparative

The compound of Example 3 was based on a commercial EP rubber (Buna EP T 2070). The amount of peroxide used was 2 phr.

The cured compound gave the following test results: delta torque=19.13 dN·m, Shore A hardness=70 points, ultimate tensile=5.28 MPa, and ultimate elongation=335%.

Example 4

Comparative

The compound of Example 4 was based on a commercial rubber (Bayer XL-10000). The amount of peroxide used was 2 phr.

The cured compound gave the following test results: delta torque=11.45 dN·m, Shore A hardness=57 points, ultimate tensile=4.86 MPa, and ultimate elongation=126%.

Example 5

Invention

The compound of Example 5 was based on the rubber composed of commercial Bayer Butyl RB 402 (70 phr) and commercial EPDM (Buna EP T 3950) (30 phr). The amount of peroxide used was 3 phr.

The cured compound gave the following test results: delta torque=11.30 dN·m, Shore A hardness=56 points, ultimate tensile=7.31 MPa, and ultimate elongation=131%.

Example 6

Invention

The compound of Example 6 was based on a 1:1 blend of commercial Butyl RB 402 and commercial EPDM (Buna EP T 3950). The blend was prepared on a large mill at 55° C., then put in a Brabender internal mixer and treated in the same way as polymers described in the other examples. The amount of peroxide used was 3 phr.

The cured compound gave the following test results: delta torque=17.99 dN·m, Shore A hardness=57 points, ultimate tensile=11.89 MPa, and ultimate elongation=203%.

Example 7

Invention

The compound of Example 7 was based on the rubber composed of commercial butyl RB 402 (50 phr) and commercial EP rubber (Buna EP T 2070) (50 phr), loaded at the same time into the Brabender mixer. The amount of peroxide used was 3 phr.

The cured compound gave the following test results: delta torque=12.32 dN·m, Shore A hardness=60 points, ultimate tensile=8.52 MPa, and ultimate elongation=314%.

The results for the compositions according to the present invention are summarized in Table 1 and the MDR traces of the compounds are given in FIG. 1.

TABLE 1

Properties of Compounds 4-7.

| Property | System | | | |
|---|---|---|---|---|
| | XL-10000 Example 4 | IIR + Buna Example 5 | IIR + Buna Example 6 | IIR + Buna Example 7 |
| Hardness, Shore A (pts.) | 57 | 56 | 57 | 60 |
| Ultimate Elongation (%) | 126 | 131 | 203 | 314 |
| Ultimate Tensile (MPa) | 4.86 | 7.31 | 11.89 | 8.52 |
| Δ Torque (dNm) | 11.45 | 11.30 | 17.99 | 12.32 |

These results demonstrate that the inventive compounds have properties after curing similar or better than those for the comparative compound based on XL-10000. As mentioned, butyl rubber can not be cured with peroxides alone (see comparative Example 1), but compounds based on both EPDM rubber (Example 2) and the EP rubber (Example 3) gave well vulcanized compounds, as evidenced by high values of Shore A hardness and ultimate tensile.

These results further demonstrate that the inventive compounds (Example 5 and 6) have similar Shore A hardness than the reference Compound 4, but at the same time they have improved both the ultimate elongation and ultimate tensile. Also, delta torque values are similar or improved. The inventive Compound 7 had both a higher Shore A hardness and a higher ultimate elongation than the Compound 4. A combination of a high hardness and a high elongation is advantageous for condenser cap application.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A rubber compound comprising 50 to 98 parts of a non-halogenated butyl rubber polymer per hundred parts rubber, 2 to 50 parts per hundred parts rubber of an olefin polymer of ethylene and at least one α-olefin and, optionally, at least one diene, the said compound having between 2 to 5 phr of a peroxide curing agent.

2. A rubber compound according to claim 1, wherein the olefin polymer is EP(D)M rubber.

3. A rubber compound according to claim 1, wherein the peroxide curing agent is selected from the group consisting of dialkylperoxides, ketalperoxides, aralkylperoxides, peroxide ethers, peroxide esters.

4. A rubber compound according to claim 3, wherein the peroxide curing agent is selected from the group consisting of di-tert,-butylperoxide, bis-(tert,-butylperoxyisopropyl)-benzene, dicumylperoxide, 2,5-dimethyl-2,5-di(tert,-butylperoxy)-hexane, 2,5-dimethyl-2,5-di(tert,-butylperoxy)-hexene-(3), 1,1-bis-(tert,-butylperoxy)-3,3,5-trimethyl-cyclohexane, benzoylperoxide, tert-butylcumyl peroxide, tert,-butylperbenzoate and mixtures thereof.

5. A rubber compound according to claim 1 further comprising at least one filler.

6. A rubber compound according to claim 1, wherein the filler is carbon black.

7. A process for preparing a peroxide curable rubber compound comprising mixing 50 to 98 parts of a non-halogenated butyl rubber polymer per hundred parts rubber, 2 to 50 parts per hundred parts rubber of a polymer of ethylene, at least one α-olefin and, optionally, at least one diene in the presence of a peroxide curng agent.

8. A shaped article comprising the compound according to claim 1.

9. A shaped article according to claim 8, wherein the shaped article is a container for pharmaceuticals, a condenser cap, a seal for fuel cells, a container containing electrolytes, rings, dampening devices, ordinary seals, and sealants.

* * * * *